M. VIERENGEL.
Assignor to C. B. COTTRELL.
CYLINDER PRINTING MACHINE.
No. 11,227. Reissued Mar. 1, 1892.
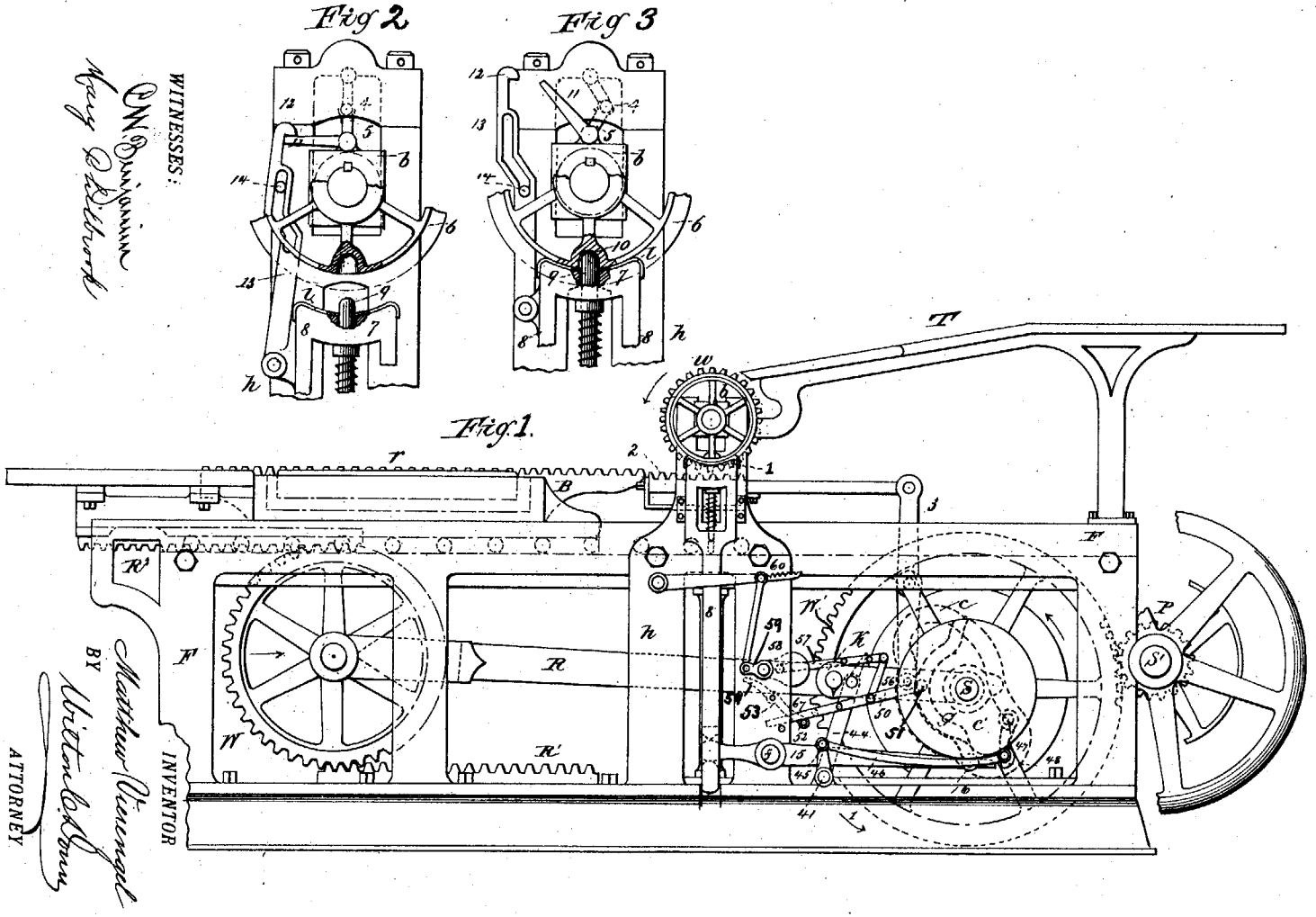
WITNESSES:
C. W. Benjamin
Mary Philbrook
INVENTOR
Matthew Vierengel
BY
Wilton A. Dunn
ATTORNEY
THE NORRIS PETERS CO., PHOTO-LITHO., WASHINGTON, D. C.

UNITED STATES PATENT OFFICE.

MATTHEW VIERENGEL, OF BROOKLYN, NEW YORK, ASSIGNOR TO CALVERT B. COTTRELL, OF STONINGTON, CONNECTICUT.

CYLINDER PRINTING-MACHINE.

SPECIFICATION forming part of Reissued Letters Patent No. 11,227, dated March 1, 1892.

Original No. 379,188, dated March 6, 1888. Application for reissue filed June 29, 1888. Serial No. 278,601.

DIVISION A.

*To all whom it may concern:*

Be it known that I, MATTHEW VIERENGEL, of Brooklyn, in the county of Kings and State of New York, have invented a new and useful Cylinder Printing-Machine, of which the following is a specification.

My invention relates to improvements in cylinder printing-machines, as set forth in the following specification and claims, and illustrated in the accompanying drawings, in which—

Figure 1 represents a side elevation of my improved cylinder printing-machine; Figs. 2 and 3, detail views, partly in section, of the impression-cylinder and the mechanism for holding it in its operative and inoperative position when in its printing and out of its printing position, respectively.

Referring to the drawings, F represents the frame of the printing-machine.

T is the feed-board.

C the impression-cylinder, the journals of which are supported in suitable bearings in sliding boxes *b*, held in ways in the vertical housings *h h*, rising from the frame of the machine. The ends of the cylinder are fitted with toothed wheels *w w*, that mesh with the side racks *r r* on the form-bed B when the cylinder is in position for making the impression, so that by the backward motion of the bed the cylinder is revolved. The wheel *w* at one end of the cylinder has on its outer rim next to the housing and at a point diametrically opposite to the grippers on the cylinder a toothed segment 1, the teeth of which are coincident with the teeth of the wheel and are in position to be engaged by a short rack-bar 2, placed in suitable supports parallel to the form-bed rack and operated in harmony with but independently of said rack by means of a lever 3, that is pivoted to the frame and has one end pivoted to the rack-bar and the other engaging a cam *c* on the main shaft S.

The form-bed B is reciprocated in the usual manner—that is, by a crank K on the main shaft that connects through a suitable rod R with a large rolling pinion W, meshing with a fixed rack R′ on the bottom of the frame and a rack $R^2$ on the under side of the form-bed. The form-bed is provided with suitable rollers, which run in suitable ways in the frame of the machine in the usual manner. The main shaft carries a toothed wheel *w′*, that is in engagement with a pinion P on a driving-shaft S′, that carries a balance-wheel at one end and fast and loose pulleys at the other end. The main shaft S also carries several cams—viz., cams *c*, that gives motion to the rack-bar lever 3, cams *c′ c′* on the ends of said shaft, which are each provided on its inner side with grooves *g*, (one of these grooves being indicated by dotted lines in Fig. 1,) cam $c^2$, by which is operated the mechanism that automatically locks and unlocks the said levers when it is desired that the cylinder shall not descend, and the cam $c^4$, that gives motion to the rod that moves the receiving-table toward and from the delivery-carriage.

*The impression-cylinder.*—This cylinder is much smaller than has heretofore been used with stop-cylinder presses, being in circumference about the size of the average sheet to be printed. This causes it to produce a much sharper impression than has been possible from the large cylinders heretofore used, and it is started and stopped much more readily, and its comparatively small diameter permits the press to be built lower and shorter and the feeding-table to be fixed much nearer a level than has heretofore been found practicable in this style of press; but the full impression is produced by giving the cylinder two complete revolutions to each impression, as will be more fully described hereinafter. The sliding boxes *b b*, in which the journals of the cylinder are held, are connected on both sides of the press by toggle-joints 4 with the caps of the housings. On the ends of the journals projecting out of the boxes are flat-faced brake-wheels 6 6, under which are the concave bearing-seats 7 of the heads of the cylinder-lifting rods 8 8 (see Figs. 2 and 3) in such a position relatively to the said wheels that when the rods are thrown up by the mechanism presently described the seats bear against the said wheels and lift the cylinder. One or more spring-actuated detents 9 are socketed in the heads and adjusted to engage at the proper time sockets 10, formed in the rim of the wheel 6, so that when the rods bearing the detent is lifted the detent will enter the socket and hold the cylinder as soon as it reaches the stop position—that is, with the grippers in position to take a sheet from the feed-table. To one member 5 of each of the toggle-joints is rigidly secured on each side of the press a lever or arm 11, that projects toward one edge of the housings and in position to be engaged by hooks 12 on the upper end of bars 13, that are pivotally connected with projections of the rods 8. The bars are provided with guide-slots, into which pins 14, fixed in the housing, project. When the rods 8 are drawn down to permit the cylinder to descend to make an impression, the pins acting against the sides of the slot moves the hooks on the bars toward and into engagement with the arms 11 of the toggles, so that as the rods descend the hooks cause the arms to extend the toggles, and thereby when the cylinder reaches its impression position the toggles are caused to lock it in place. (See Fig. 2.) The rods 8 8 are operated by levers 15 15, fulcrumed at *f* in the frame of the press. The short arms of said levers project into mortises in the lower ends of the said rods, and the extremity of each of the long arms is provided with a roller 16, that bears against cams *c′ c′* and enters the cam-grooves *g* in said cams when the impression is to be made. The cams keep the long arms of the two levers pressed down, and thereby the rods 8 8 are forced up and the cylinder held in its raised position and locked therein by the detents.

When by the motion of the press the form-bed is at the dead-point and begins to pass under the impression-cylinder, the cam-grooves *g* reach a position where the rollers 16 enter the same, and thereby the levers are turned, the rods 8 8 drop, and the cylinder being released descends to the point where it is in position to make the impression and is locked in that position by the toggles through the engagement and turning of arms 11 by means of the hooks 12, as shown in Fig. 2.

The shaft 41, arm 44, crank 45, rod 46, link 47, detent 48, rod 50, roller 51, pin 52, rock-lever 53, one end of which, designated 54, is intended to be held or controlled by a spring, link 56, rod 57, weight 58, crank 59, treadle 60 form, in connection with the crank K and other devices, (not shown in the drawings forming part of this specification,) the mechanism for placing the cylinder out of gear in order that the form-bed may be operated without the cylinder. The manner in which this is accomplished is as follows: When the weight 58 is in the position shown in Fig. 1, the cylinder and bed operate together and an impression is made at every forward motion of the form-bed; but when the position of the weight is reversed by the feeder pressing on the treadle 60 the rod 57 is drawn toward the weight, and thereby pins fixed to it are caused to operate mechanism connected with arm 44, whereby the crank K is caused to throw the arm 44 over to the left of its axis, and thereby through the rod 46 move the detent into position to bear against the adjacent end of lever 15, and thereby prevent the lever from lowering the cylinder to make an impression. When thus set, the form-bed will move forward and back and the cylinder will remain in its out-of-printing position until the weight is reversed and the arm returned to the position shown in Fig. 1. By means of a cam on the shaft of crank 59 when the weight is reversed the said cam is caused to bear on and press down the end of rock-lever 53, and thereby lift the rod 50, so that pins connected with it will engage mechanism on the arm 44, whereupon the reciprocation of the said rod by its cam is communicated to arm 44 and the latter is caused through the rod 46 to operate the detent to stop the lever 15 at every alternate forward movement of the form-bed, and thus put the cylinder and bed out of gear automatically and for every alternate motion forward of the form-bed for "double rolling." The above-described mechanism for putting the cylinder and form-bed out of gear with each other is more fully described in the divisional application filed by me August 26, 1891, for cylinder printing-machines, Serial No. 403,800½, and the said mechanism is not claimed herein.

I claim—

1. The combination, with an impression-cylinder provided with suitable bearings for the lifting and braking devices, of lifting-rods provided with suitable seats for engaging the said bearings and levers and cams by which the said rods are lowered and raised, substantially as specified.

2. The combination, with an impression-cylinder having wheels 6 6 on its journals, one or both of which is provided with a socket 10, of rods 8, provided with seats 7, and spring-actuated detent or detents 9, passed through said seat, so that when the rods are caused to bear against the wheels 6 and lift the cylinder the detent enters the socket and holds the cylinder steady, substantially as specified.

3. The combination, with an impression-cylinder and devices, substantially as described, for lowering and raising the same, of toggles 4 5, arm 11, and hook 12, connected with the devices by which the cylinder is lowered and raised, so that when the cylinder is lowered the hook, engaging the arm 11, causes the toggles to lock the cylinder in contact with the type or stone, substantially as specified.

4. The combination, with an impression-cylinder and the boxes in which its journals are held, of toggles connected with said boxes and the caps of the housings, an arm or lever 11, connected with one of the toggles, supporting, lowering, and raising rods 8 and hooks 13, secured to said rods and provided with longitudinal slots, and guiding-pins 14, that engage said slots, whereby when the cylinder is lowered the hook is caused to engage the arm 11 and adjust the toggles to lock the cylder down in contact with the sheet on the form, substantially as specified.

In testimony whereof I have set my hand, in the presence of two subscribing witnesses, this 13th day of June, 1888.

MATTHEW VIERENGEL.

In presence of—
WILTON C. DONN,
WHITAUR C. VAN METER.